July 29, 1924.
H. R. HOFFMAN
1,502,953
AUTOMATIC TRANSMISSION FOR MOTOR VEHICLES
Filed May 13, 1922    2 Sheets-Sheet 1
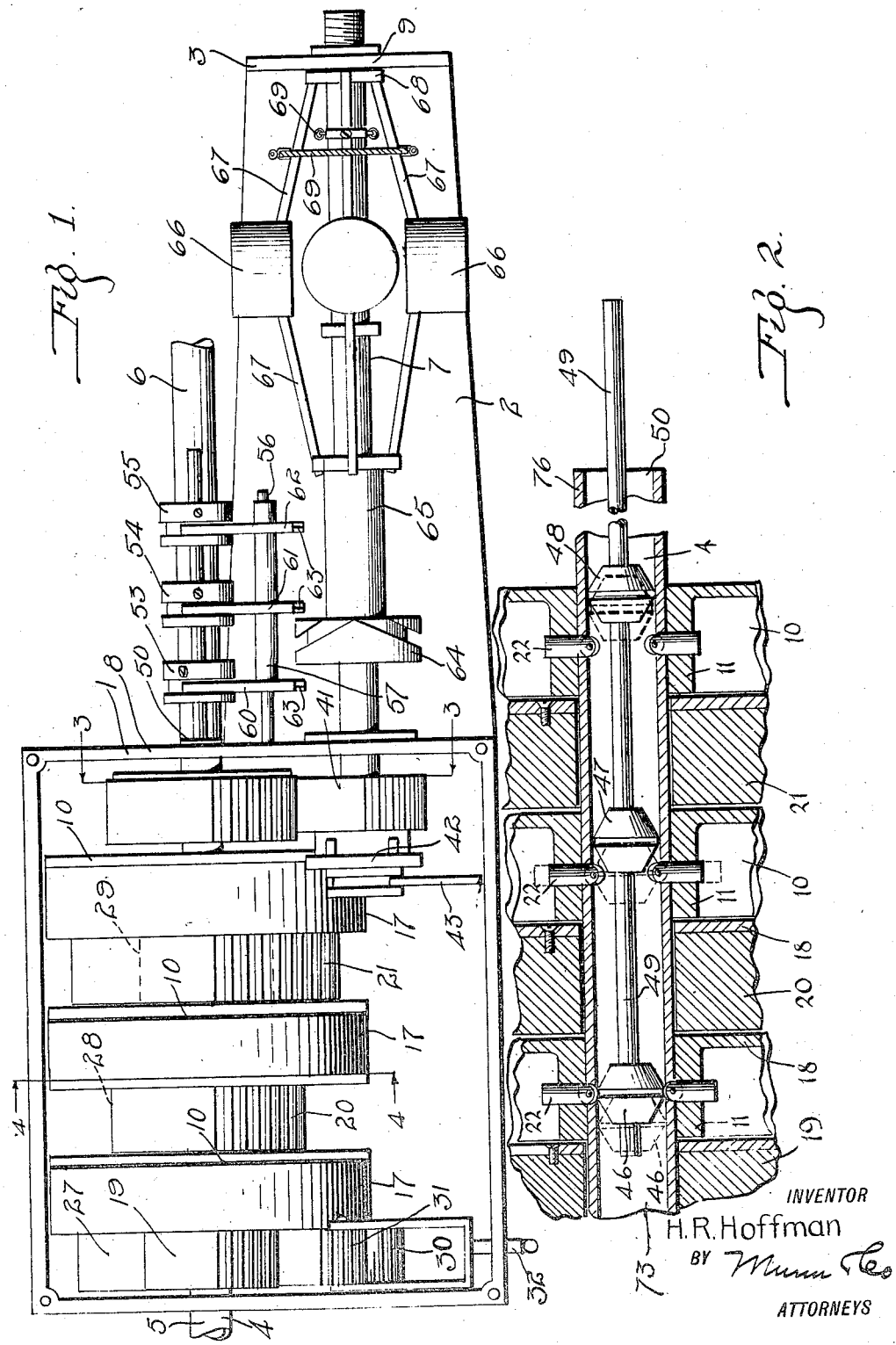
INVENTOR
H.R. Hoffman
BY
ATTORNEYS July 29, 1924. 1,502,953
H. R. HOFFMAN
AUTOMATIC TRANSMISSION FOR MOTOR VEHICLES
Filed May 13, 1922   2 Sheets-Sheet 2
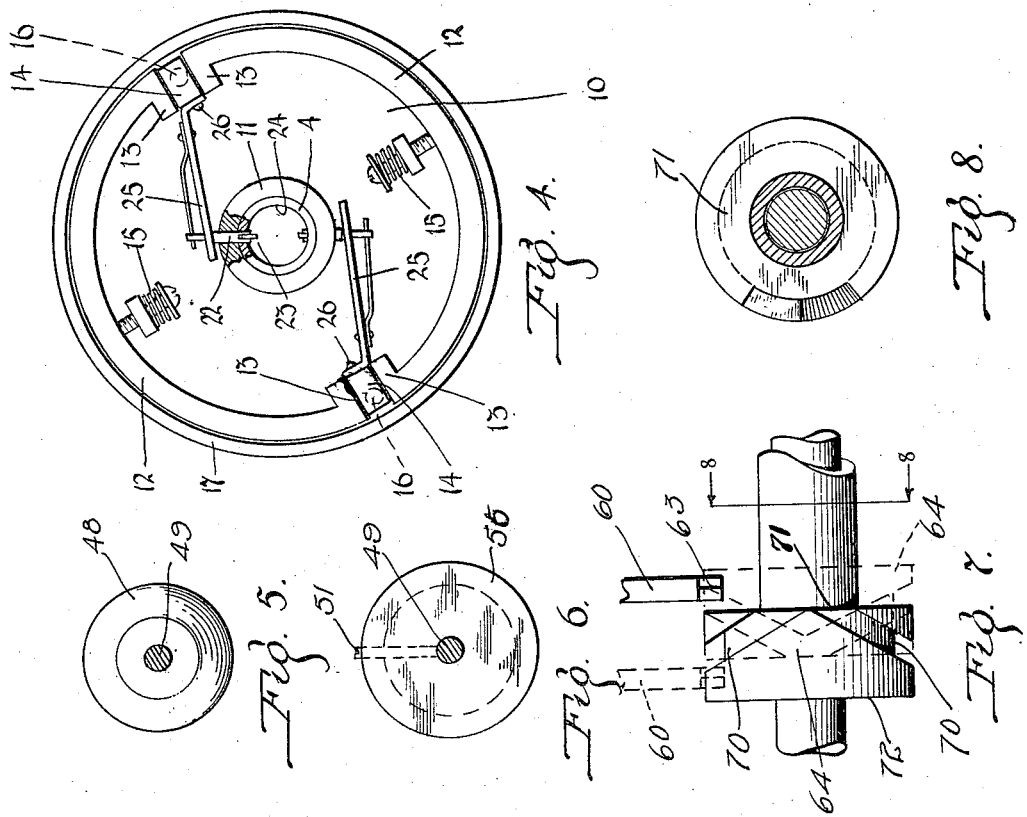
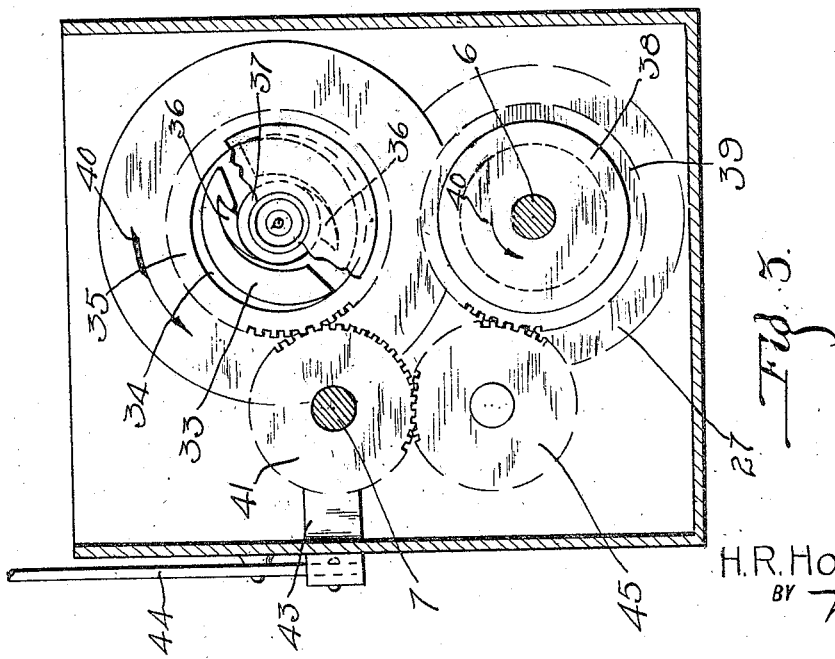
INVENTOR
H. R. Hoffman
BY
ATTORNEYS Patented July 29, 1924.

1,502,953

UNITED STATES PATENT OFFICE.

HENRY R. HOFFMAN, OF CHICAGO, ILLINOIS.

AUTOMATIC TRANSMISSION FOR MOTOR VEHICLES.

Application filed May 13, 1922. Serial No. 560,597.

*To all whom it may concern:*

Be it known that I, HENRY R. HOFFMAN, a citizen of the United States, and a resident of Chicago, in the county of Cook and State of Illinois, have invented a new and useful Improvement in Automatic Transmissions for Motor Vehicles, of which the following is a full, clear, and exact description.

My invention relates to improvements in automatic transmissions for motor vehicles, and more particularly to the type disclosed in my prior application for patent on automatic gear shift and speed control, Serial No. 514,666, and it consists in the combinations, constructions, and arrangements herein described and claimed.

An object of my invention is to provide a device of the character described in which manual shifting of the speed gears is entirely obviated.

A further object of my invention is to provide a device of the character described in which the gear ratio intermediate the motor and the differential shaft is progressively increased as the speed of the differential shaft is increased.

A further object of my invention is to provide a device of the character described in which there is no opportunity for a slipping of the expansion clutches as the power is transmitted selectively through the various gears from one to another.

A further object of my invention is to provide a device of the character described for use on a motor vehicle which will eliminate the necessity of the present clutch mechanism, the foot clutch series, and the gear shift lever.

A further object of my invention is to provide a device of the character described having a series of clutches disposed intermediate the engine shaft from the differential shaft, and in which the clutches are arranged to selectively engage and drive the differential shaft, dependent upon the speed at which the differential shaft rotates.

A further object of my invention is to provide a device of the character described in which the transmission may be automatically moved into low gear by merely pressing the accelerator and increasing the speed of the engine, thereby obviating the necessity of an auxiliary lever as required in certain of the devices heretofore disclosed.

Other objects and advantages will appear in the following specification, and the novel features of the invention will be particularly pointed out in the appended claims.

My invention is illustrated in the accompanying drawings forming part of this application, in which Figure 1 is a top plan view of an embodiment of my invention, Figure 2 is an enlarged sectional view of a part of the mechanism illustrated in Figure 1, Figure 3 is a sectional view along the line 3—3 of Figure 1, Figure 4 is a sectional view along the line 4—4 of Figure 1, Figure 5 is an enlarged end elevation of one of the sliding cam members illustrated in Figure 2, Figure 6 is an enlarged end elevation of one of the gripping members illustrated in Figure 1, Figure 7 is an enlarged plan view of the revolving drum cam, and Figure 8 is a sectional view along the line 8—8 of Figure 7.

In carrying out my invention, I make use of a metal casing 1 having an upwardly extending base portion 2 upturned at its outermost end, as shown at 3. A hollow shaft 4 is rotatably mounted in the casing 1 and its outer end 5 is adapted to be connected to the engine of a motor vehicle. A shaft 6 is rotatably mounted in the casing 1 immediately beneath the shaft 4 and has one end extending beyond the casing and arranged for connection with the differential (not shown) of a motor vehicle. A third shaft 7 is rotatably mounted at one end upon the wall 8 of the casing 1 and at its opposite end on the upturned portion 3 of the base 2 as shown at 9. This shaft is for the purpose of supporting a governor to be hereinafter described.

The shaft 4 is provided with three spaced apart expansion clutch members as shown in Figure 4. These clutch members comprise plates 10 securely fixed by means of integral sleeve portions 11 against rotation upon the shaft 4. A pair of diametrically opposed arcuate shoes 12 are supported upon the plate 10 so that their adjacent ends 13 are spaced apart at a predetermined distance. A pair of pivotally mounted blocks 14 are supported upon the plate 10 between the adjacent ends 13 of the shoes 12 and normally lie in the position shown in Figure 4. Compression springs 15 are employed by an arrangement such as clearly shown in Figure 4 to constantly hold the ends 13 of the shoes 12 in close engagement with the sides of the blocks 14. It will be obvious that movement of the blocks 14 on their pivotal supports 16 will cause the shoes 12 to move toward the periphery of the plate 10, and frictionally engage an annular band 17. This annular band 17 has a cover plate 18 fixed at one edge thereof to form a casing, thus virtually enclosing the mechanism illustrated in Figure 4. Gears 19, 20, and 21 are carried by the plates 18, respectively, the smallest gear, as reference to Figure 1 will show, being adjacent the end 5 of the shaft 4. The gears 18 to 21 inclusive, and the plates 18 are rotatably mounted upon the shaft 4 and will only turn with the shaft when the shoes 12 of the expansion clutch are forced outwardly.

Means for actuating the shoes 12 in the clutch is provided in a pair of slidable plungers 22 having rollers 23 at their outer ends. The rollers 23 are arranged to normally lie within the bore 24 of the shaft 4. The outer ends of the plungers 22 are connected by means of a rigid lever 25 to the blocks 14, as shown at 26, so that longitudinal movement of the plungers will cause the blocks 14 to move upon their pivotal supports 16, and thus occasion the engagement of the shoes 12 with the band 17.

Three gears 27, 28, and 29 are disposed upon the shaft 6. The gear 27 is slightly smaller than the gear 28, and the gears 28 and 29 are arranged to lie in mesh with the gears 20 and 21. The gear 27 is slightly smaller than the gear 21 and therefore does not lie in mesh with the gear 19. This particular arrangement of gears has been clearly shown in my co-pending application for patent on automatic gear shift and speed control, bearing the Serial No. 514,666. The gears 19 and 27 are arranged to be operatively connected with one another through a reversing gear mechanism consisting of two gears 30 and 31. A lever 32 is employed for manipulating the gears 30 and 31 so that at one time the gear 30 alone is in mesh with the gears 19 and 27, and at another time, the gears 30 and 31 form a train between the gears 19 and 27. This latter arrangement, brought about by movement of the lever 32, will cause the shaft 6 to move in a reverse direction when the clutch associated with the gear 19 is engaged.

A cam ratchet mechanism, as shown in Figure 3 is carried upon the shaft 4 adjacent its inner end. This mechanism consists in a pair of cam-shaped pawls 33 arranged to frictionally engage the inner wall 34 of a gear 35 when the shaft 4 is turned in one direction, and to slip upon the wall 34 when the shaft 4 is turned in the opposite direction. The ratchet mechanism further consists in a pair of arcuate teeth 36 carried upon the hub 37, which are arranged to engage the pawls 33 when the shaft 4 is turned.

The hub 37 is securely locked or keyed to the shaft 4.

A second ratchet mechanism 38 is supported upon the shaft 6 and is provided with a gear 39 forming a part of the housing for the mechanism. The arrangement of the pawls in this mechanism is precisely the same relative to the shaft as the pawls 33, and the gear 39 will therefore move only when the shaft 6 is driven in the direction indicated by the arrow 40.

A gear 41 is carried by the shaft 7 and arranged to turn with the shaft 7 when a jaw clutch supported upon the shaft 7, as shown at 42, is engaged therewith. Means for moving the jaw clutch 42 out of engagement with the gear 41 is provided in a plate 43 which is adapted to be moved laterally by a lever 44. The lever 44 may be operated manually by the driver in the manner hereinafter described.

A second gear 45 similar to the gear 41 is in mesh with the gear 41 and the gear 39 so that the gears 35 and 39 will both move in the same direction.

Means for selectively and progressively operating the clutches associated with the gears 19, 20, and 21 is provided in three cam members 46, 47, and 48. These cam members are substantially the shape shown in Figure 2, having two diametrically opposed tapering sides and a groove on the periphery thereof. Reference to Figure 2 will show that the cam 46 is in a position to cause the adjacent plungers 22 to move longitudinally through the sleeve portion 11 of the plate 10. This will cause the shoes 12 to move outwardly in the manner heretofore described, and the shoes will frictionally engage the bands 17. Thus, the gear 19 will turn with the shaft 4 and drive the shaft 6 and the shaft 7. The other two gears 20 and 21 will merely idle on the shaft 6. If the cam 46 is moved out of engagment with the plungers 22, and the cam 47 simultaneously moved into engagement with its adjacent plungers, thus the gear 20 will turn with the shaft 4 and the remaining two gears will idle.

This selective and progressive engagement of the clutches to drive the several gears 19 to 21 inclusive is brought about in the following manner. The cam members 46, 47, and 48 are fixed upon a single shaft 49 as shown in Figure 2. It will be noted that the cams 46 to 48 inclusive are not at equal distances from one another, but are so arranged that when the cam 46 is in mesh with its adjacent plungers 22, the cams 47 and 48 are out of engagement with their adjacent plungers, the cam 48 being at a greater distance from its adjacent plungers than the cam 47. If the shaft 49 is moved longitudinally to the left as viewed in Fig. 2, the cams will assume the position shown in dotted lines, and the cam 47 will engage the adjacent plungers 22, leaving the cams 46 and 48 free in the hollow shaft 4. Thus only the gear 20 will be driven. A still further advance of the shaft 49 will move the cam 48 into engagement with its adjacent plungers and simultaneously release the cam 47 from its position shown in dotted lines, and the gear 21 alone will be driven by the shaft 4. This arrangement permits the selective engagement of the several cams by movement of the shaft 49.

The shaft 49 is provided with three equally spaced apart guide members 53, 54, and 55. These guide members are arranged so that movement thereof laterally will occasion the longitudinal movement of the shaft 48. A stationary shaft 56 is secured to the wall 8 of the casing 1 and lies parallel to the shaft 6, extending outwardly adjacent the outer ends of the shaft 49.

The shaft 56 has slidably mounted thereon a sleeve 57. The sleeve 57 has mounted thereon three transversely disposed fingers 60, 61, and 62. These fingers are arranged to engage the guide members 53 to 55, respectively, so that movement of the fingers will occasion a like movement of the guide members and the shaft 49. The outer end, i. e., that end adjacent the shaft 7 of the fingers 60 to 62 inclusive, is provided with a triangular-shaped portion 63. This portion 63 of the fingers is more clearly shown in Figure 7, and is for the purpose of receiving a rapidly moving cam hereinafter described.

Means for instantaneously moving the guide members 53 to 55 inclusive, is provided in a revolving drum cam 64. This cam is supported upon a sleeve 65. The sleeve 65 is slidably mounted upon the shaft 7. A governor mechanism comprising weights 66 and arms 67, pivotally supporting weights intermediate a fixed washer 68 and the sleeve 65, and tension springs 69 connected between the diametrically opposed pairs of arms 67, serves as a means for moving the drum cam 64 laterally as the speed of the shaft 7 is increased.

With reference to Figure 7 it will be noted that the drum cam 64 is provided with a pair of grooves 70 on the periphery thereof, the grooves arranged in zig-zag fashion so that one end opens upon the end 71 of the cam, and the opposite end opens upon the end 72 of the cam. The cam is shown turned 180 degrees in the dotted lines of Figure 7.

The guide members 53 to 55 inclusive are fixed against movement on the shaft 49 by means of set screws 51 (see Figure 6).

From the foregoing description of the various parts of the device, the operation thereof may be readily understood. My present invention provides an automatic transmission for motor vehicles in which the change from first speed to second, and from second speed to third is effected instantaneously, i. e., the clutch adjacent the cam 19 may be released at the same instant that the clutch adjacent the cam 20 is engaged, and so forth. This movement is of utmost importance in the art, since it obviates the possibility of dangerous slipping of the clutch, such as most frequently occurs in the ordinary type of automatic gear shift.

Let us assume that the device is installed in a motor vehicle and the cam 46 is to the right of its associate plungers 22 and out of engagement therewith as viewed in Figure 2. This is the true position of the cam when the motor vehicle is at a stand-still and the engine is not in operation.

The first movement in starting the vehicle would be the manual movement of the lever 44 to disengage the jaw clutch 42 so that the shaft 7 would not revolve with the shaft 4. The ignition is then turned on and the engine started in the usual manner. The driver may then race the engine as is desirable for warming the engine, especially in winter weather. This may be done as long as the lever 44 is moved to disengage the clutch 42.

Let us assume now that the vehicle is to be driven. The driver first reduces the speed of the engine and then releases the lever 44. When the lever 44 is released, the jaw clutch 42 will become engaged with the gear 41 and the shaft 7 will turn with the shaft 4. At this time, the shaft 6 is at a stand-still, since the vehicle is not moving. The driver then presses down on the accelerator and fuel is fed to the engine. As the engine shaft 4 increases in speed, the shaft 7 will be driven at a higher rate of speed and the governor mechanism will actuate to move the drum cam 64 laterally upon the shaft 7. The drum cam 64 (see Figure 7) will gradually approach, in its outward movement on the shaft 7, the finger 60 until the finger 60 becomes engaged with the groove 70 of the cam. Because of the rapid movement of the cam 64, the finger 60 will be instantaneously moved to the position shown in dotted lines and the shaft 49 will be moved therewith to occasion the engagement of the cam 46 with its adjacent plungers 22. The clutch associated with the gear 19 is now engaged and the shaft 6 will be driven through the gear train 30—31. As the shaft 6 is driven, the vehicle moves forwardly or in reverse, dependent upon the position of the gear train 30—31. Let us assume that the vehicle moves forwardly. The vehicle will continue to move along in first speed, i. e., the gear 19 and the gear 27 forming the driving compound, together with the gear train 30—31. As the speed of the vehicle increases due to the acceleration of the fuel, the shaft 7 will also increase and the governor will expand still further. As this is done, the drum cam will approach and finally engage the finger 61. When the cam 64 engages the finger 61, it will instantaneously move the finger 61 to the left (see Figure 1). This will occasion a second progressive movement of the shaft 49 and the cam 46 will move to the position shown in dotted lines in Figure 2. The cam 47 will simultaneously be moved into engagement with its adjacent plungers 22, and the shaft 6 will be driven through the gear train 20—28. The vehicle is now in second speed.

Further pressure of the accelerator will cause the shaft 7 to rotate at a greater speed and the governor will again expand. The drum 64 will now approach the finger 62 and engage the finger to cause the instantaneous lateral movement of the finger, and the shaft 47 will be again moved longitudinally. The last movement will cause the cam 48 to engage its adjacent plungers 22 and the cam 47 to disengage the plungers 22 adjacent thereto. It should be remembered that since the cams are securely fixed to the shaft 49 that the disengagement and engagement of the cams is brought about simultaneously in every event. The vehicle may now be driven in high speed.

As the speed of the vehicle is decreased, i. e., the shaft 7 moves at a slower rate of speed, then the drum cam 64 will move toward the casing 1 as the governor contracts. As it approaches the adjacent of the fingers 60 to 62 inclusive, it will instantaneously engage and move that finger. The movement this time will be to release the cam 48 (in this particular case) from engagement with its associate plungers 22 and to move the cam 47 into engagement with the adjacent plungers 22, thus shifting the speed from high to second.

If the speed of the motor is again decreased, then the governor will contract still further, and the cam 64 will engage and move the finger 61. This will move the cam 47 out of engagement with the associate plungers 22.

It should be noted that the ratchet gear mechanism 35 and 38 are so arranged that the shaft 4 or the shaft 6 may drive the shaft 7, dependent upon which of these two shafts, 4 or 6, is moving the fastest, i. e., if the vehicle is moving along the road at a high rate of speed and the engine is idling, the governor will be driven at a relatively high rate of speed and the vehicle will be running in high speed. Another important advantage of this ratchet gear arrangement is that the shaft 7 may be rotated while the vehicle is at a stand-still, thus doing away with the necessity of an especially provided manual gear shifting arrangement for placing the transmission in first speed.

I claim:

1. In a device of the character described, a sliding cam shaft, and means for intermittently moving said cam shaft longitudinally, said means comprising a plurality of fingers extending laterally of said shaft adjacent one end, a drum having a helical groove in the peripheral wall thereof at a relatively steep pitch, said groove in said drum being arranged to engage said fingers as said drum is moved longitudinally, said drum being mounted for rotation and with its axis in parallel relation to said cam shaft, means for rotating said drum, and means associated with said first named means for moving said drum longitudinally.

2. In a device of the character described, a driven shaft, a plurality of clutches associated with said shaft, a gear for each of said clutches, a second shaft having gears thereon in mesh with said first named gears, and means operatively connected with said second named shaft for progressively engaging said clutches one at a time at predetermined intervals as the speed of said second named shaft is changed, the engagement and release of said clutches being substantially simultaneous, said means comprising a sliding cam shaft for operating said clutches, a plurality of fingers extending radially from said cam shaft, a drum having a helical groove in the peripheral wall thereof arranged to engage said fingers as said drum is moved longitudinally, said drum being mounted for rotation and having its axis parallel to the axis of said cam shaft, means for rotating said drum, and other means associated with said first named means for causing said drum to move longitudinally.

3. In a device of the character described, a sliding cam shaft, and means for intermittently moving said cam shaft longitudinally, said means comprising a plurality of fingers extending laterally of said cam shaft, a drum having a helical groove in the peripheral wall thereof, said drum being arranged to engage said fingers as said drum is moved longitudinally, a shaft mounted for rotation, a centrifugal governor disposed on said shaft, said drum being mounted on said shaft and connected with said governor, whereby said drum may rotate with said shaft and to move longitudinally as said governor expands and contracts, thereby moving into engagement with said fingers to cause the movement of said cam shaft.

HENRY R. HOFFMAN.